UNITED STATES PATENT OFFICE.

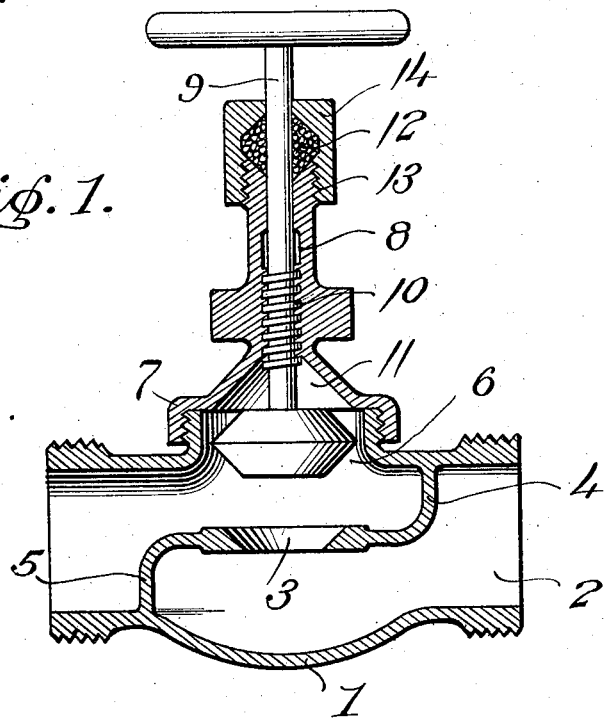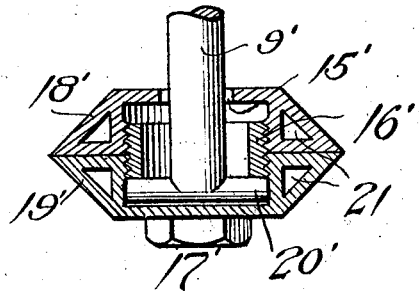

THOMAS S. HUSHER, OF SOUTH BOSTON, MASSACHUSETTS.

VALVE.

1,234,477.      Specification of Letters Patent.      Patented July 24, 1917.

Application filed October 5, 1915.    Serial No. 54,191.

*To all whom it may concern:*

Be it known that I, THOMAS S. HUSHER, a citizen of the United States, residing at South Boston, in the county of Suffolk and State of Massachusetts, have invented certain new and useful Improvements in Valves, of which the following is a specification.

My invention relates to an improved valve, and more particularly to a valve of that type known in the trade as a globe valve.

It is often the cause of much delay and expense, to pack the usual type of globe valve when the stuffing box becomes leaky, and particularly this is true when the pressure is on the upper side of the valve element, for often when the stuffing box is loosened for repacking the fluid leaks around the valve stem, and provided the fluid is steam as is often the case, the pressure must be reduced to almost nothing before the valve can be repacked.

Therefore, it is one of the principal objects of the present invention to provide a valve in which the above-mentioned disadvantage and the trouble incident thereto is eliminated.

A further object resides in providing a novel form of valve element, together with two seats, one of which is engaged by the valve element to cut off flow through the valve and the other of which is so located that when the valve element is brought into engagement therewith the valve stem stuffing box is relieved of pressure.

A still further object resides in so arranging the seats and valve element that when the valve is wide open the stuffing box must necessarily be relieved of pressure because of the engagement of the valve element with the particular seat controlling the valve stem.

With the above and other objects in view, I will now proceed to describe a specific embodiment of my invention as illustrated in the accompanying drawing comprising a part of this specification.

In the drawing:—

Figure 1 is a central sectional view through a valve constructed according to my invention, and Fig. 2 is a central sectional view through the valve element.

In detail: the valve, as shown, comprises the casing 1 provided with the fluid passage 2 in which is located the valve seat 3, the closing of which will interrupt the flow through the valve. The valve seat 3 is of conical bore and is supported by the webs 4 and 5.

Directly over the valve seat 3 is an opening 6, the edge of which projects slightly above the valve casing 1 and is threaded. Screwed upon the projecting edge of this opening 6 is the valve bonnet 7 which is bored at 8 to accommodate the valve stem 9 and is also threaded so as to accommodate the threads 10 of said valve stem which engage with the threads in the bore of the bonnet to move the valve stem 9 to an open or closed position upon rotation of the latter. The bonnet is provided with a conical seat 11 at its lower end, which controls the bore 8, and at its upper end is countersunk as shown to receive the stuffing box packing 12, the upper end of the bonnet being threaded as shown at 13 to receive the stuffing box proper 14 which screws down upon the packing 13 and wedges it tightly around the valve stem 9 preventing leakage.

The improved valve comprises upper and lower halves or sections 18′ and 19′, the said sections being of substantially frusto-conical shape, and being assembled with their largest ends abutting. The angularly disposed portions of these valve sections are adapted to engage and fit snugly against the angularly inclined walls of the bonnet 11, and the similarly disposed walls of the seat 3.

The valve stem 9′ is provided, at its lower end, with a transverse cylindrical member 20′ upon which a nipple 16′ rests. The upper half 18′ of the valve element is drilled at 15′ slightly larger than stem 9′ and said half is threaded onto nipple 16′. The other half 19′ is threaded onto the nipple and turned up tight by means of the hexagonal boss 17′. It will be seen from this construction that the valve element may have a swivel action relative to stem 9′. If desired, in order to tighten the construction and economize in material the upper and lower halves 18′ and 19′ may be cored out as shown at 21.

In the operation of the valve, if the stem 9 is turned to open the valve to its extreme open position, the conical face of the upper half 18′ of the valve element rests on the seat 11 of the bonnet, thereby making a tight joint and effectually preventing leakage of fluid through the bonnet. When the valve is normally in wide open position, the pressure on the stuffing box is relieved, and the stuffing box may be repacked, even though the pressure of the flow through the valve remains normal. On the other hand, when the valve is closed, the lower half 19' of the valve element rests upon the seat 3 and prevents the flow of fluid through the valve. The advantages of this construction, reside in the fact that the halves of the valve elements may be cheaply made due to the fact that they are cored out as shown at 21, and may also be easily renewed. Furthermore the swivel action between the valve element and stem accommodates for any seating irregularities.

While I have described specific embodiments of the invention in the foregoing specification, it is to be understood, however, that I do not limit myself to the specific details herein described except in so far as the scope of the appended claims import.

I claim:—

1. A valve including a valve head and stem, the latter including an integral transverse member having cylindrical ends, the valve head including two halves each having a counter-bore, said stem extending through one half and having its transverse member located in the counter-bore of the other half, and means lying wholly within the counter-bore of both of said halves to connect the two halves and also for engagement with the cylindrical ends of said transverse member.

2. A valve including a valve head and stem, the latter including an integral transverse member, the valve head including two halves each having a counter-bore, said stem extending through one half and having its transverse member located in the counter-bore of the other half, and means lying wholly within the counter-bore of both of said halves to connect the two halves and in engagement with the transverse member.

3. A valve including a valve head and stem, the latter including an integral transverse member, the valve head including two halves each having a counter-bore, the said stem extending loosely through one half and having its transverse member located in the counter-bore of the other half, and threaded means lying wholly within the counter-bore of both halves and connecting the same and in engagement with the said transverse member.

4. A valve including a valve head and stem, the latter including an integral transverse member having cylindrical ends, the valve head including two halves each having a counter-bore, the said stem extending loosely through one half and having its transverse member located in the counter-bore of the other half, and threaded means lying wholly within the counter-bore of both halves and connecting the same and in engagement with the cylindrical ends of said transverse member whereby a journal is formed.

In testimony whereof I affix my signature in presence of two witnesses.

THOMAS S. HUSHER.

Witnesses:
Amos L. Phillips,
Thomas J. Monahan.

Copies of this patent may be obtained for five cents each, by addressing the "Commissioner of Patents Washington, D. C."